US008532594B2

(12) United States Patent
McDowell et al.

(10) Patent No.: US 8,532,594 B2
(45) Date of Patent: Sep. 10, 2013

(54) PORTABLE CELL PHONE AND A PROXIMITY REGULATION SYSTEM FOR USE WITH A PORTABLE CELL PHONE

(75) Inventors: Richard L. McDowell, Chalfont, PA (US); Philip D. Mooney, Sellersville, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 13/398,656

(22) Filed: Feb. 16, 2012

(65) Prior Publication Data

US 2012/0149440 A1 Jun. 14, 2012

Related U.S. Application Data

(63) Continuation of application No. 12/367,078, filed on Feb. 6, 2009, now Pat. No. 8,140,128, which is a continuation of application No. 11/369,363, filed on Mar. 7, 2006, now Pat. No. 7,499,722, and a continuation of application No. 09/967,140, filed on Sep. 28, 2001, now Pat. No. 7,039,435.

(51) Int. Cl.
*H04B 17/00* (2006.01)
*H04B 7/00* (2006.01)

(52) U.S. Cl.
USPC .............. 455/115.1; 455/522; 455/575.2

(58) Field of Classification Search
USPC ............ 455/115.1, 522, 550.1, 127.1, 569.1, 455/575.6, 575.2
See application file for complete search history.

(56) References Cited

U.S. PATENT DOCUMENTS

| 4,636,741 | A | 1/1987 | Mitzlaff |
| 5,541,609 | A | 7/1996 | Stutzman et al. |
| 5,590,417 | A | 12/1996 | Rydbeck |
| 5,724,667 | A | 3/1998 | Furuno |
| 5,956,626 | A | 9/1999 | Kaschke et al. |
| 5,983,073 | A * | 11/1999 | Ditzik ................... 455/11.1 |
| 6,195,562 | B1 | 2/2001 | Pirhonen et al. |
| 6,377,785 | B1 * | 4/2002 | Ogino ................. 455/127.5 |
| 6,408,187 | B1 | 6/2002 | Merriam |
| 6,456,856 | B1 | 9/2002 | Werling et al. |
| 6,498,924 | B2 | 12/2002 | Vogel et al. |
| 6,628,784 | B1 | 9/2003 | Montane Condemines |
| 6,710,651 | B2 | 3/2004 | Forrester |
| 6,745,014 | B1 | 6/2004 | Seibert et al. |
| 6,944,483 | B1 | 9/2005 | Motohashi |
| 7,031,657 | B2 | 4/2006 | Terhani |
| 7,039,373 | B2 | 5/2006 | Ichikawa |

(Continued)

FOREIGN PATENT DOCUMENTS

| EP | 0843421 A2 | 5/1998 |
| EP | 0977304 A1 | 2/2000 |

(Continued)

OTHER PUBLICATIONS

Kobayashi, K., Examiner's Office Letter, letter, Jun. 22, 2006; 2 pages; Japan.

*Primary Examiner* — Sonny Trinh

(57) ABSTRACT

Proximity regulation systems for use with a portable cell phone and portable cell phones are disclosed. In one embodiment, the portable cell phone includes: (1) an operation mode input or circuit and (2) means for determining a transmit power level of the portable cell phone based on the operation mode input or circuit.

19 Claims, 3 Drawing Sheets

(56) References Cited

U.S. PATENT DOCUMENTS

| | | |
|---|---|---|
| 7,039,435 B2 | 5/2006 | McDowell et al. |
| 7,047,052 B2 | 5/2006 | Akai et al. |
| 7,053,629 B2 | 5/2006 | Nevermann |
| 7,071,776 B2 | 7/2006 | Forrester et al. |
| 7,146,139 B2 | 12/2006 | Nevermann |
| 7,242,356 B2 | 7/2007 | Lu et al. |
| 7,330,705 B2 | 2/2008 | Lee |
| 7,499,722 B2 | 3/2009 | McDowell et al. |
| 7,511,513 B2 * | 3/2009 | Nevermann .................. 324/644 |
| 8,023,984 B2 | 9/2011 | Jin et al. |
| 8,140,128 B2 * | 3/2012 | McDowell et al. ........ 455/569.1 |
| 2003/0064761 A1 | 4/2003 | Nevermann |
| 2003/0076168 A1 | 4/2003 | Forrester |
| 2004/0176125 A1 | 9/2004 | Lee |
| 2004/0203345 A1 | 10/2004 | Tehrani |
| 2005/0075123 A1 | 4/2005 | Jin et al. |
| 2005/0093624 A1 | 5/2005 | Forrester et al. |
| 2005/0124305 A1 | 6/2005 | Stichelbout |
| 2009/0143113 A1 | 6/2009 | McDowell et al. |

FOREIGN PATENT DOCUMENTS

| | | |
|---|---|---|
| GB | 2380359 A | 2/2003 |
| JP | 2001223514 | 8/2001 |
| WO | WO9829968 | 7/1998 |
| WO | WO0205443 A2 | 1/2002 |

* cited by examiner

PORTABLE CELL PHONE AND A PROXIMITY REGULATION SYSTEM FOR USE WITH A PORTABLE CELL PHONE

CROSS REFERENCE TO RELATED APPLICATIONS

This application is a continuation of U.S. patent application Ser. No. 12/367,078 entitled "A PORTABLE CELL PHONE AND A PROXIMITY REGULATION SYSTEM FOR USE WITH A PORTABLE CELL PHONE", filed on Feb. 6, 2009, now U.S. Pat. No. 8,140,128 by Richard L. McDowell, et al., which is currently pending and is a continuation of U.S. patent Ser. No. 11/369,363, entitled "A PROXIMITY REGULATION SYSTEM FOR USE WITH A PORTABLE CELL PHONE AND A METHOD OF OPERATION THEREOF", filed on Mar. 7, 2006, by Richard L. McDowell, et al., issued as U.S. Pat. No. 7,499,722 on Mar. 3, 2009, and is a continuation of U.S. patent application Ser. No. 09/967,140, filed on Sep. 28, 2001, that issued as U.S. Pat. No. 7,039,435 on May 2, 2006. The above-listed applications are commonly assigned with the present application and are incorporated herein by reference as if reproduced herein in their entirety.

TECHNICAL FIELD OF THE INVENTION

The present invention is directed, in general, to a mobile telecommunications device and, more specifically, to a system and method of determining a proximity transmit power level of a portable cell phone based on a proximity to a user.

BACKGROUND OF THE INVENTION

Since the inception of the wireless or cellular ("cell") phone in the late 1940s, cell phone usage has expanded beyond their utilitarian beginnings. Presently, cell phones are being used in every aspect of business along with every facet of personal life. People of all ages are now using cell phones as the price of cell phones and services decrease. Presently, more than 74 million cell phones are in use in the United States with estimates predicting more than 139 million in a few years. Cell phones are moving beyond communication tools, and are now taking a place in history by weaving themselves into the social fabric by becoming fashion statements and symbols of power and importance.

Along with the increase in usage has come the requests for improved service and communication quality. Consumers are now looking for more than just wireless voice communication but also Internet access, calendars, organizers, and even games. Meanwhile, manufacturers struggle to meet consumer demands for more options and better quality of service.

Typically, the quality of service of a cell phone is proportional to the transmit power level of the cell phone. Though no definite proof has been determined, health concerns have arisen due to the power used to transmit the radio frequency of cell phones when operated close to the body of a cell phone user. For example, when held close to the ear, many users have health concerns about the high levels of radio frequency energy causing damage to brain cells.

Most of the concerns from consumers center around using the cell phone close to the ear or head of a user. New studies, however, have also suggested that cell phone usage may possibly cause stomach cancer when located near the midsection when sending and receiving data text messaging. Cell phone users still want the best possible quality of service from their cell phone. However, health concerns regarding the transmit power of cell phones are now beginning to affect some users.

Manufacturers have tried several options to relieve the fears of consumers. One such option involves permanently reducing the power of the transmitter in cell phones. Though this may be perceived as a safety advantage to some customers, unfortunately, this also reduces the quality of service of the cell phone. Another option for consumers is the use of cell phones with a base that typically allows a higher transmit power level of up to three watts. This may be the case for a cell phone that is permanently mounted, such as in an automobile. These type of cell phones, however, do not allow the flexibility demanded by consumers that is found in the use of a portable cell phone.

Accordingly, what is needed in the art is a system and method to automatically reduce the transmit power level of a portable cell phone when located near a human body thereby decreasing the perception of health risks associated with the use thereof.

SUMMARY OF THE INVENTION

In one aspect, a portable cell phone is disclosed. In one embodiment the portable cell phone includes: (1) an operation mode input or circuit and (2) means for determining a transmit power level of the portable cell phone based on the operation mode input or circuit.

In another aspect, a proximity regulation system for use with a portable cell phone is provided. In one embodiment, the proximity regulation system includes a power governing subsystem configured to determine a transmit power level of the portable cell phone based on a mode of operation thereof.

In yet another aspect, another embodiment of a proximity regulation system for use with a portable cell phone is disclosed. In this embodiment, the proximity regulation system includes means for determining a transmit power level of the portable cell phone based on a mode of operation thereof.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
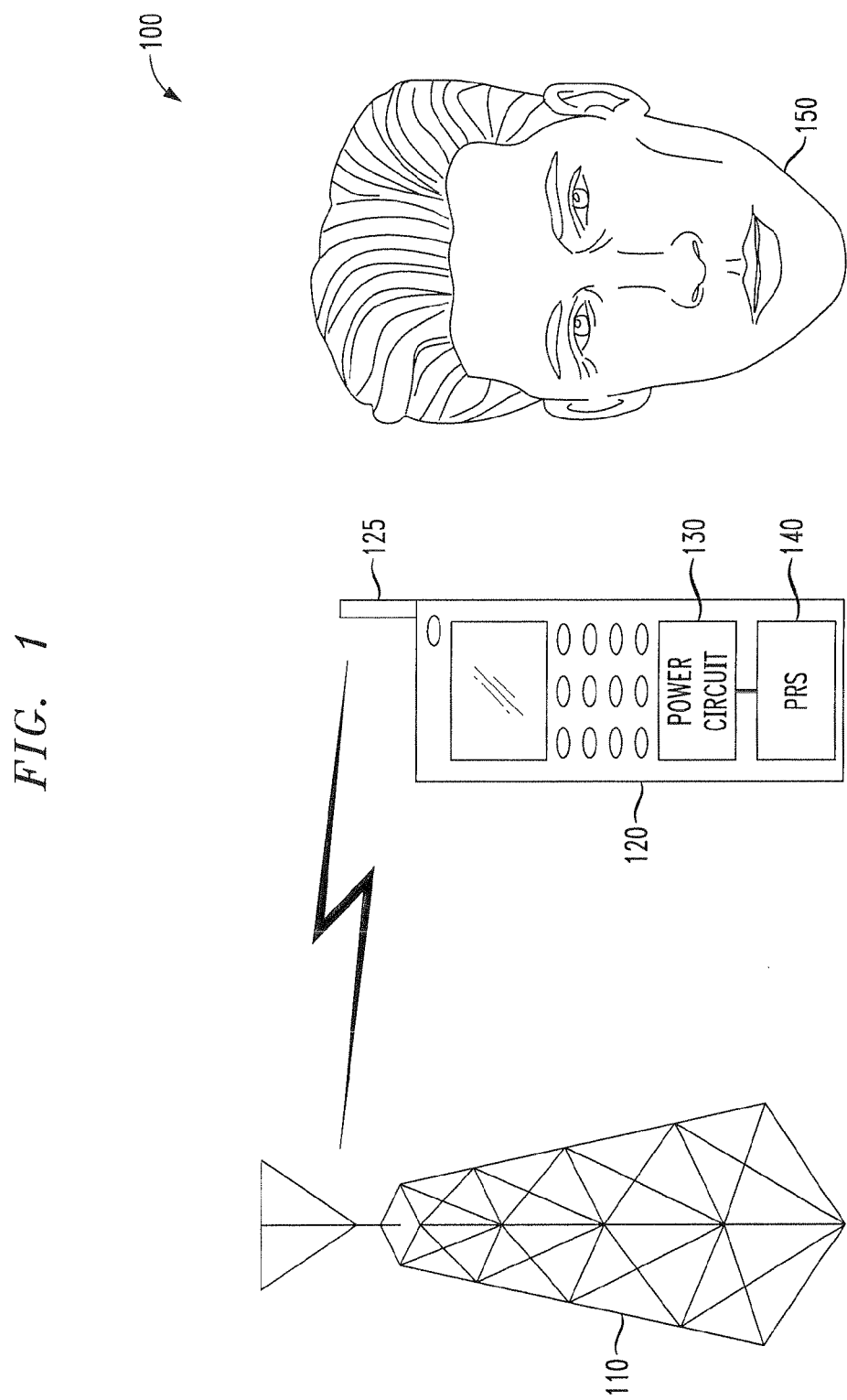
FIG. 1 illustrates a network diagram of an embodiment of a cellular telephone network employing a portable cell phone constructed in accordance with the principles of the present invention.

Referring initially to FIG. 1, illustrated is a network diagram of an embodiment of a cellular telephone network, generally designated 100, employing a portable cell phone 120 constructed in accordance with the principles of the present invention. The cellular telephone network 100 includes a communications tower 110 in communication with the portable cell phone 120, employable by a portable cell phone user 150. The portable cell phone 120 includes an antenna 125, a power circuit 130 and a proximity regulation system 140.

The communications tower 110 is a conventional communications tower that is positioned to communicate with the portable cell phone 120. The communications tower 110 may provide either analog or digital communications depending on the cellular telephone network 100 being used. For more information regarding communications towers and their use in cellular telephone networks, see "Mobile Communications Engineering: Theory and Applications" by William C. Y. Lee, McGraw Hill (1997), which is incorporated herein by reference.

In the illustrated embodiment, the portable cell phone 120 is a digital cell phone capable of receiving both voice and text messaging. In an alternative embodiment, the portable cell phone 120 may also be capable of using a headset attachment to allow hands-free operation. The portable cell phone 120 may also attach to a belt clip for storage or for use in conjunction with a headset attachment. In addition, the portable cell phone 120 may also allow hands-free operation while stored in a cradle. The cradle may be a conventional cradle, which is constructed to hold or store the portable cell phone 120.

The antenna 125 is a conventional portable cell phone antenna that provides communications between the portable cell phone 120 and the communications tower 110. Through the antenna 125, the portable cell phone 120 sends and receives voice or data communications across the cellular telephone network 100 via the communications tower 110.

In the illustrated embodiment, the power circuit 130 may be a typical power circuit in the portable cell phone 120 that produces a transmit power level equivalent to, for instance, a maximum transmit power level of one watt. Through communications with the communications tower 110 employing the antenna 125, the power circuit 130 may also provide a network adjusted transmit power level that is lower than the maximum transmit power level of one watt. The network adjusted transmit power level is based on a transmit signal strength of a communications path between the communications tower 110 and the portable cell phone 120.

In an advantageous embodiment of the present invention, the power circuit 130 is further coupled to the proximity regulation system 140 that determines a proximity transmit power level of the portable cell phone 120 based on its location proximate the portable cell phone user 150. Though not illustrated in FIG. 1, the proximity regulation system 140 includes a location sensing subsystem and a power governing subsystem, which cooperate to determine both the proximity transmit power level and when it may be employed. Both the location sensing subsystem and the power governing subsystem are more fully discussed with respect to FIG. 2.

The proximity regulation system 140 in the illustrated embodiment, is a dedicated device that is constructed of special-purpose hardware employing a software program, which directs its operation. In an alternative embodiment, the proximity regulation system 140 may be integrated into a power algorithm employing software that controls the power circuit 130. The proximity regulation system 140 may be installed when the portable cell phone 120 is constructed. Alternatively, the proximity regulation system 140 may be an after market addition to the already constructed portable cell phone 120. In one embodiment, the proximity regulation system 140 may be installed with a switch that allows the portable cell phone user 150 to disengage the proximity regulation system 140. In another embodiment, the proximity regulation system 140 may be used with a personal digital assistant or any other portable device that may emit radio frequency energy within the vicinity of a user.

The portable cell phone user 150 is typically anyone who uses a portable cell phone. This, of course, includes children through senior adults. In the illustrated embodiment, the portable cell phone user 150 is using the portable cell phone 120 proximate their head. Alternatively, the portable cell phone user 150 may use the portable cell phone 120 while attached to a belt clip or in conjunction with a headset. In another embodiment, the portable cell phone user 150 may use the portable cell phone 120 for data text messaging. In this case, the portable cell phone 120 may be typically located in front of the portable cell phone user 150 and within a distance of an arm's length. It is also contemplated that the portable cell phone 120 may transmit and receive other forms of multimedia communications such as video.

Figure 2:
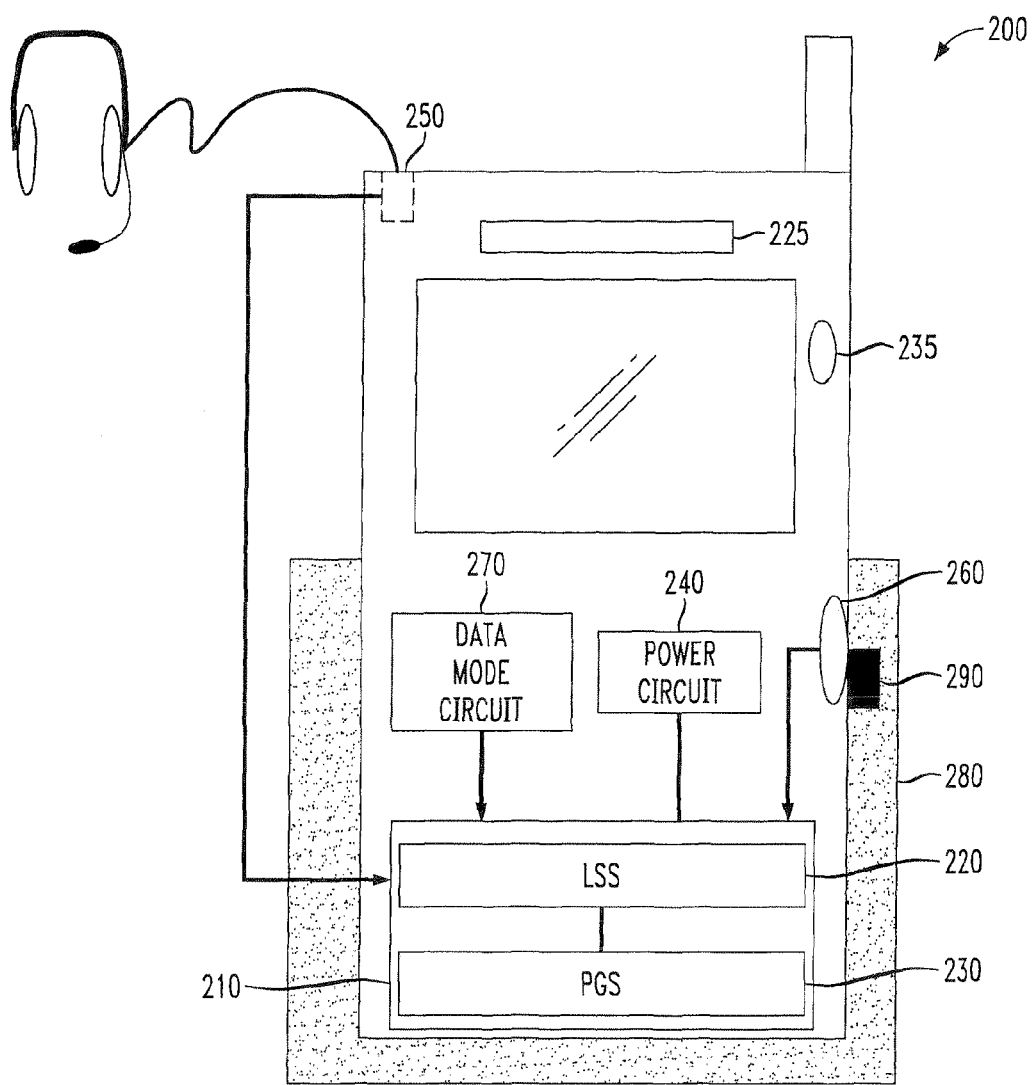
FIG. 2 illustrates a block diagram of an embodiment of a portable cell phone employing a proximity regulation system constructed in accordance with the principles of the present invention.

Turning now to FIG. 2, illustrated is a block diagram of an embodiment of a portable cell phone, generally designated 200, employing a proximity regulation system 210 constructed in accordance with the principles of the present invention. The portable cell phone 200 includes the proximity regulation system 210, a power circuit 240, a headset operation mode input 250, a belt clip sensor 260 and a data transfer operation mode circuit 270. The portable cell phone 200 is attached to a belt clip 280 having a position indicator 290. The proximity regulation system 210 includes a location sensing subsystem 220 and a power governing subsystem 230.

The proximity regulation system 210 determines a proximity transmit power level of the portable cell phone 200 based on the location of the portable cell phone 200 proximate a portable cell phone user. In the illustrated embodiment, the proximity regulation system 210 is a dedicated device that is solely hardwired. As discussed above with respect to FIG. 1, the proximity regulation system 210 is coupled to the power circuit 240. Additionally, the proximity regulation system 210 is coupled to the headset operation mode input 250, the belt clip sensor 260 and the data transfer operation mode circuit 270. Of course, a portable cell phone may still employ the proximity regulation system 210 without the headset operation mode input 250, the belt clip sensor 260 or the data transfer operation mode circuit 270.

The location sensing subsystem 220 is coupled to the power governing subsystem 230, and determines a location of the portable cell phone 200 proximate a user. In the illustrated embodiment, the location sensing subsystem 220 is embodied in an integrated circuit. In another embodiment, the location sensing subsystem 220 may be embodied as a sequence of operating instructions.

In an exemplary embodiment, the location sensing subsystem 220 determines that the portable cell phone 200 is proximate the head of the user if there is no indication that the portable cell phone 200 is in a data transfer operation mode, a headset operation mode or located on a belt clip. In another embodiment, the location sensing subsystem 220 may determine if the portable cell phone 200 is proximate the head of the user through a designated sensor 225 located on the portable cell phone 200.

The designated sensor 225 may be an inductively coupled loop that changes a surrounding magnetic field when in the vicinity of the user's head. The change in the magnetic field creates a change in the inductive coupling thereby causing an impedance change associated with the inductively coupled loop. The impedance change may affect the current flow in the inductively coupled loop, which can be used to indicate the proximity of the portable cell phone 200 to the user's head.

In an alternative embodiment, the designated sensor 225 may also be a contact sensor that indicates proximity of the portable cell phone 200 to the user's head when the portable cell phone 200 is touching the user's ear. The contact sensor may also indicate proximity of the portable cell phone 200 to the user by contact from the user's hand. One skilled in the pertinent art will understand that other sensors may be used to indicate the proximity of the portable cell phone 200 to the user's body.

In an alternative embodiment, the location sensing subsystem 220 determines that the portable cell phone 200 is proximate the body of the user when receiving an indication from the data transfer operation mode circuit 270. Additionally, the location sensing subsystem 220 may determine that the portable cell phone 200 is proximate the body of the user if the portable cell phone 200 is located on the belt clip 280 or a headset is inserted in the headset operation mode input 250. Still, another embodiment may indicate that the portable cell phone 200 is away from the body of the user when the portable cell phone 200 is in a cradle.

The power governing subsystem 230 is coupled to the location sensing subsystem 220. The power governing subsystem 230 determines the proximity transmit power level of the portable cell phone 200 based on the location of the portable cell phone 200 as determined by the location sensing subsystem 220. In one embodiment, the network adjusted transmit power level may be reduced to a value determined by the proximity transmit power level when the location of the portable cell phone 200 is within the vicinity of the user's head. In another embodiment, the network adjusted transmit power level may be similarly reduced when the location of the portable cell phone 200 is just within the vicinity of a user's body.

In another embodiment, the proximity transmit power level may match the network adjusted transmit power level, which may be the maximum transmit power level of, for instance, one watt, when the portable cell phone 200 is operating in the headset operation mode or the data transfer mode. In still another embodiment, the proximity transmit power level may be further reduced when the portable cell phone user is a child. A switch 235 may be installed on the portable cell phone 200 to allow this user option. Additionally, the switch 235 may also allow the user to disengage the proximity regulation system 210 whenever desired. In one embodiment, the switch 235 may be a standard software switch that the user controls through a display and a keypad of the portable cell phone 200.

The headset operation mode input 250 is a conventional receptacle for receiving a headset that allows hands-free operation. As mentioned above, the headset operation mode input 250 is coupled to the proximity regulation system 210. The location sensing subsystem 220 of the proximity regulation system 210 receives an indication that the headset is in use from the headset operation mode input 250 when a headset is inserted. In one embodiment, the location sensing subsystem 220 determines that the portable cell phone 200 is not within the vicinity of the head of the user upon receiving indication from the headset operation mode input 250.

In another embodiment, the location sensing subsystem 220 may determine that the portable cell phone 200 is within the vicinity of the user's body if the headset is inserted in the headset operation mode input 250. In an alternative embodiment, the location sensing subsystem 220 may determine that the headset operation mode input 250 may be used in conjunction with the belt clip sensor 260 to indicate that the portable cell phone 200 is proximate the user's body.

The belt clip sensor 260 is coupled to the proximity regulation system 210 and indicates when the portable cell phone 200 is located within the belt clip 280. The belt clip sensor 260 may be a contact sensor that is depressed by a protrusion on the belt clip 280 when placed in the belt clip 280. In an alternative embodiment, the belt clip sensor 260 may use an inductively coupled loop constructed to indicate to the location sensing subsystem 220 that the portable cell phone 200 is in the belt clip 280.

The data transfer operation mode circuit 270 is coupled to the proximity regulation system 210 and indicates to the location sensing subsystem 220 of the proximity regulation system 210 when the portable cell phone 200 is being used for data text messaging. As mentioned above with respect to the discussion of the antenna 125 of FIG. 1, the data text messaging may be received from a communications network via an antenna such as those shown in FIG. 1.

The belt clip 280 is a conventional device for holding the portable cell phone 200. The belt clip 280 is typically constructed of plastic and constructed to attach to a user's belt. The belt clip 280 may hold the portable cell phone 200 when the user is not using the portable cell phone 200. In alternative embodiments, the belt clip 280 may hold the portable cell phone 200 when the headset is being employed. In other embodiments, another type of clip may be used by the user to hold the portable cell phone 200. For example, instead of the belt clip 280, the user may store the portable cell phone 200 in a clip that attaches to a shirt pocket or an arm band.

The position indicator 290 of the belt clip 280 may be a protrusion that depresses the belt clip sensor 260 on the portable cell phone 200 to indicate to the location sensing subsystem 220 that the portable cell phone 200 is positioned in the belt clip 280. In an alternative embodiment, the position indicator 290 may be a metallic insert that varies the magnetic field of an inductively coupled loop of the belt clip sensor 260. It should be noted that other pertinent components not shown may be included within the portable cell phone 200 without departing from the scope of the present invention.

Figure 3:
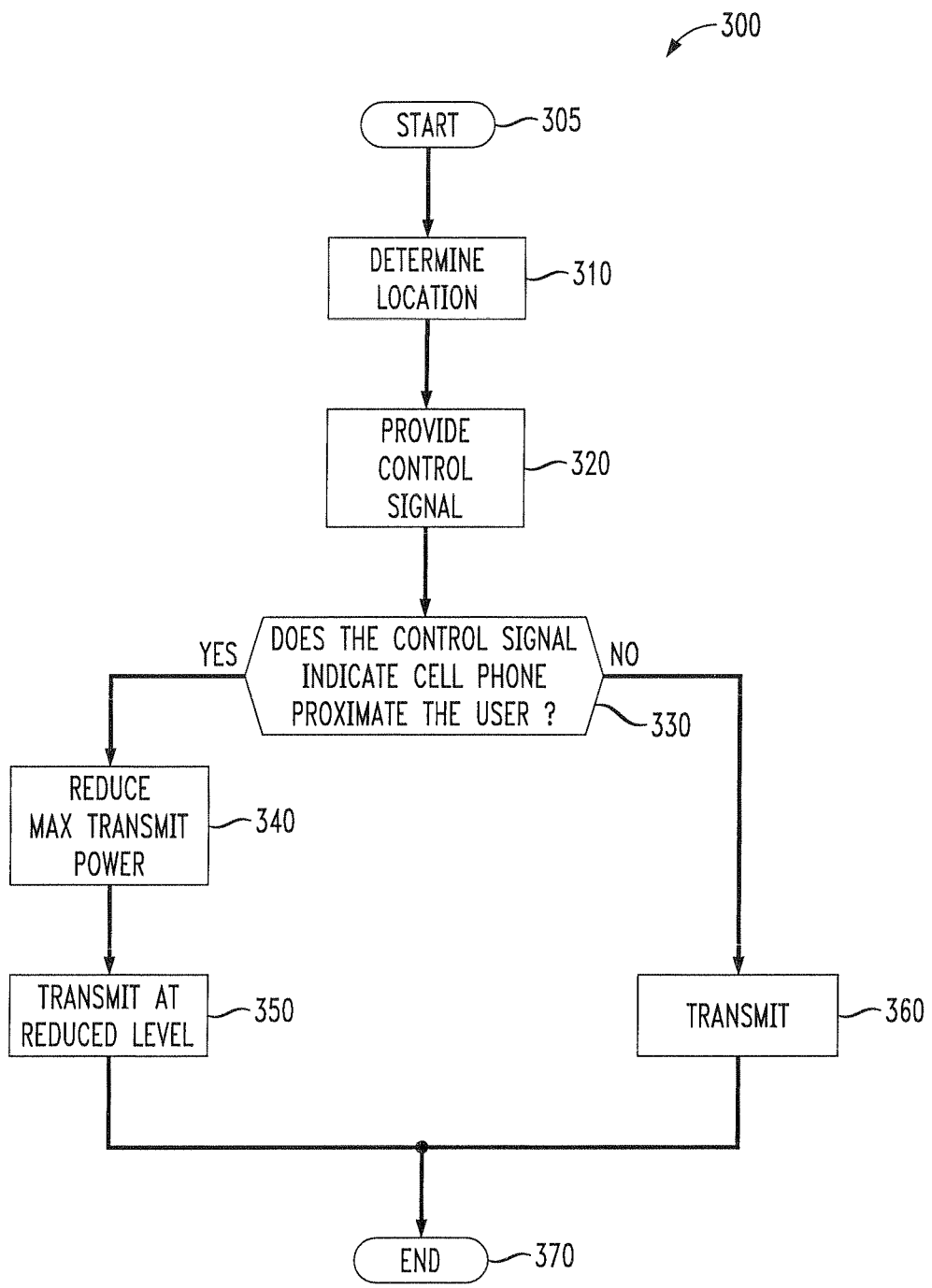
FIG. 3 illustrates a flow diagram of an embodiment of a method of operating a portable cell phone constructed in accordance with the principles of the present invention.

Turning now to FIG. 3, illustrated is a flow diagram of an embodiment of a method, generally designated 300, of operating a portable cell phone constructed in accordance with the principles of the present invention. The method 300 starts in a step 305 with an intent to operate a portable cell phone.

Following the step 305, the portable cell phone determines its location proximate a user in a step 310. In one embodiment, the location may be determined by a designated sensor that indicates the proximity of the portable cell phone to a user's head. In alternative embodiments, the location may be determined by other sensors including a belt clip sensor, a cradle sensor, or a headset sensor.

After determining proximity to the user, the portable cell phone provides a control signal in a step 320. The control signal may, for instance, be either a voltage level or current level that is designated to correspond to the previously determined location. Those skilled in the pertinent art will understand the use of control signals to represent a determined condition.

After providing a control signal, the portable cell phone determines if the control signal indicates proximity of the portable cell phone to the user in a first decisional step 330. In one embodiment, various control signals may be designated to correspond to different locations of the portable cell phone proximate the portable cell phone user. For example, one control signal may represent that the portable cell phone is in the vicinity of the user's head. Another control signal may be used to represent that the portable cell phone is in the vicinity of the user's body. In alternative embodiments, the control signal may represent that the portable cell phone is not within the vicinity of the user's body.

In the illustrated embodiment, if it is determined that the portable cell phone is proximate the user, then the transmit power level is reduced as determined by a value of a proximity transmit power level, in a step 340. In one embodiment, the transmit power level may be reduced to one network adjusted transmit power level whenever the portable cell phone is within the vicinity of any part of the user's body. In another embodiment, the transmit power level may be reduced to various allowable proximity transmit power levels depending on the vicinity of the portable cell phone to different parts of the user's body.

After adjusting the transmit power level, the portable cell phone then transmits at a reduced level in a step 350. In one embodiment, the adjusted transmit power level may not exceed the network adjusted transmit power level as determined by the communications path between the portable cell phone and the communications tower. In other embodiments, the adjusted transmit power level may be reduced to the proximity transmit power level. Finally, the transmission of the portable cell phone ends in a step 370.

Returning now to the first decisional step 330, if the portable cell phone is not proximate the user, then the method 300 proceeds to a step 360 wherein the portable cell phone transmits at the network adjusted transmit power level. In one embodiment, the network adjusted transmit power level may equal the maximum transmit power level of a portable cell phone. In other embodiments, the network adjusted transmit power level may be a reduction from the maximum transmit power level due to the communications path between the communications tower and the portable cell phone. After transmitting in step 370, the method 300 ends in the previously mentioned step 360.

Although the present invention has been described in detail, those skilled in the art should understand that they can make various changes, substitutions and alterations herein without departing from the spirit and scope of the invention in its broadest form.

What is claimed is:

1. A portable cell phone, comprising:
   an operation mode input or circuit;
   means for determining a transmit power level of said portable cell phone based on said operation mode input or circuit; and
   an option switch configured to allow a user to:
      control said transmit power level independent of an operation mode of said portable cell phone; and
      disengage a proximity regulation system.

2. The portable cell phone as recited in claim 1 wherein said transmit power level is for communications between said portable cell phone and a communications tower of a cellular telephone network.

3. The portable cell phone as recited in claim 1 wherein said operation mode input or circuit is a headset operation mode input.

4. The portable cell phone as recited in claim 1 wherein said operation mode input or circuit is a data transfer operation mode circuit.

5. The portable cell phone as recited in claim 1 wherein said transmit power level is a maximum transmit power level for said portable cell phone when said portable cell phone is operating in a headset operation mode based on said operation mode input or circuit.

6. The portable cell phone as recited in claim 1 wherein said transmit power level is a maximum transmit power level for said portable cell phone when said portable cell phone is operating in a data transfer operation mode based on said operation mode input or circuit.

7. The portable cell phone as recited in claim 1 wherein said option switch is configured to reduce said transmit power level upon activation thereof.

8. A proximity regulation system for use with a portable cell phone, comprising:
   a power governing subsystem configured to determine a transmit power level of said portable cell phone based on a mode of operation thereof; and
   an option switch configured to allow a user to engage and disengage said proximity regulation system.

9. The proximity regulation system as recited in claim 8 wherein said transmit power level is for communications between said portable cell phone and a communications tower of a cellular telephone network.

10. The proximity regulation system as recited in claim 8 wherein said mode of operation is a headset operation mode.

11. The proximity regulation system as recited in claim 8 wherein said mode of operation is a data transfer operation mode.

12. The proximity regulation system as recited in claim 8 wherein said transmit power level is maximum when said portable cell phone is operating in a headset operation mode.

13. The proximity regulation system as recited in claim 8 wherein said transmit power level is maximum when said portable cell phone is operating in a data transfer operation mode.

14. A proximity regulation system for use with a portable cell phone, comprising:
   means for determining a transmit power level of said portable cell phone based on a mode of operation thereof; and
   an option switch configured to allow a user to:
      control said transmit power level independent of an operation mode of said portable cell phone; and
      disengage said proximity regulation system.

15. The proximity regulation system as recited in claim 14 wherein said transmit power level is for communications between said portable cell phone and a communications tower of a cellular telephone network.

16. The proximity regulation system as recited in claim 14 wherein said transmit power level is limited to a predetermined maximum level.

17. The proximity regulation system as recited in claim 14 wherein said transmit power level is maximum when said portable cell phone is operating in a headset operation mode or a data transfer operation mode.

18. The proximity regulation system as recited in claim 14 wherein said mode of operation is based on a user of said portable cell phone.

19. The proximity regulation system as recited in claim 14 wherein said transmit power level is reduced based on input of said option switch.

* * * * *